April 10, 1934.    I. B. LASKOWITZ    1,953,964
CENTRIFUGAL VARIABLE THRUST MECHANISM
Filed June 11, 1931    2 Sheets-Sheet 1
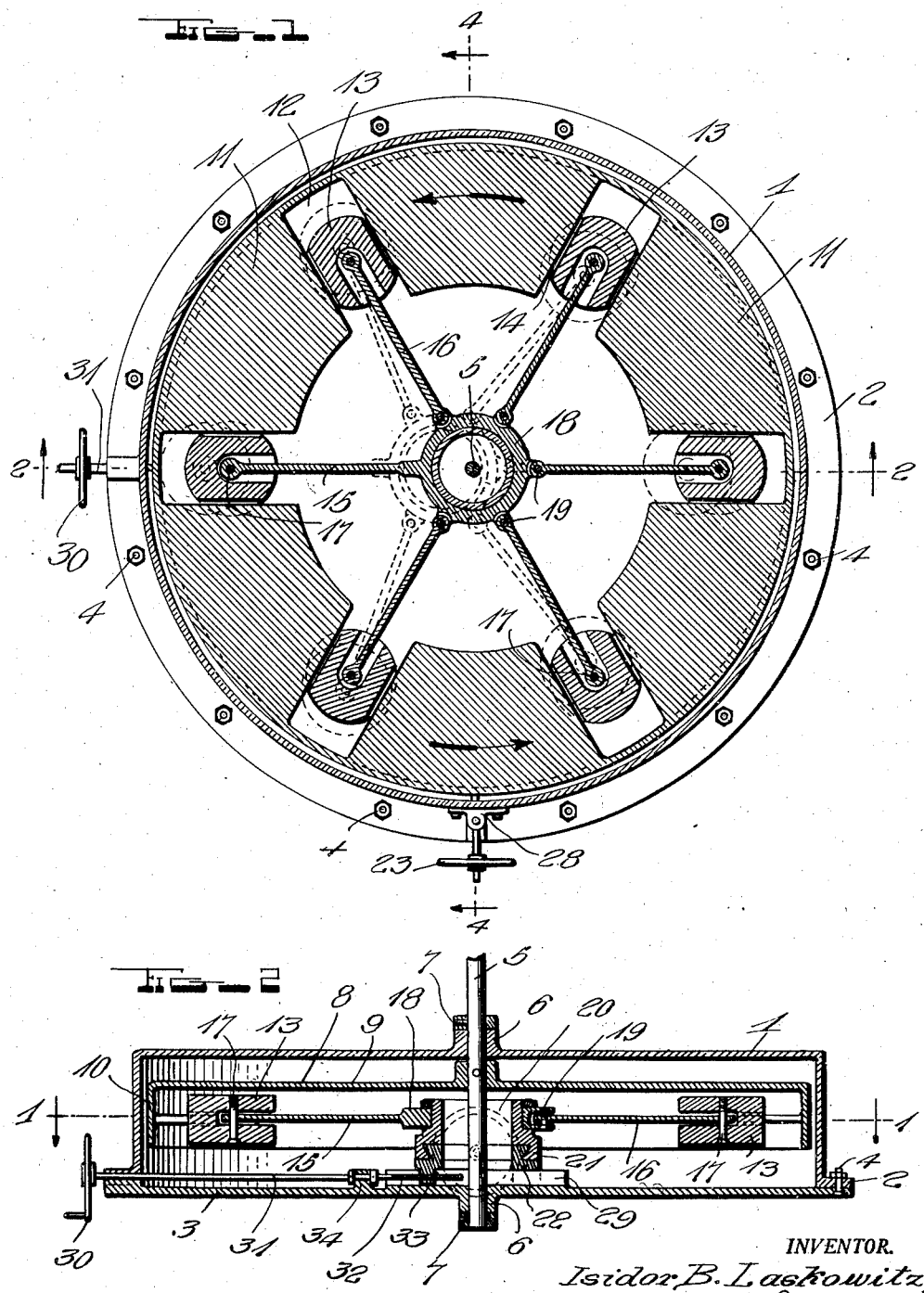
INVENTOR.
Isidor B. Laskowitz,
BY Robert L. Dennison
ATTORNEY April 10, 1934.  I. B. LASKOWITZ  1,953,964
CENTRIFUGAL VARIABLE THRUST MECHANISM
Filed June 11, 1931  2 Sheets-Sheet 2
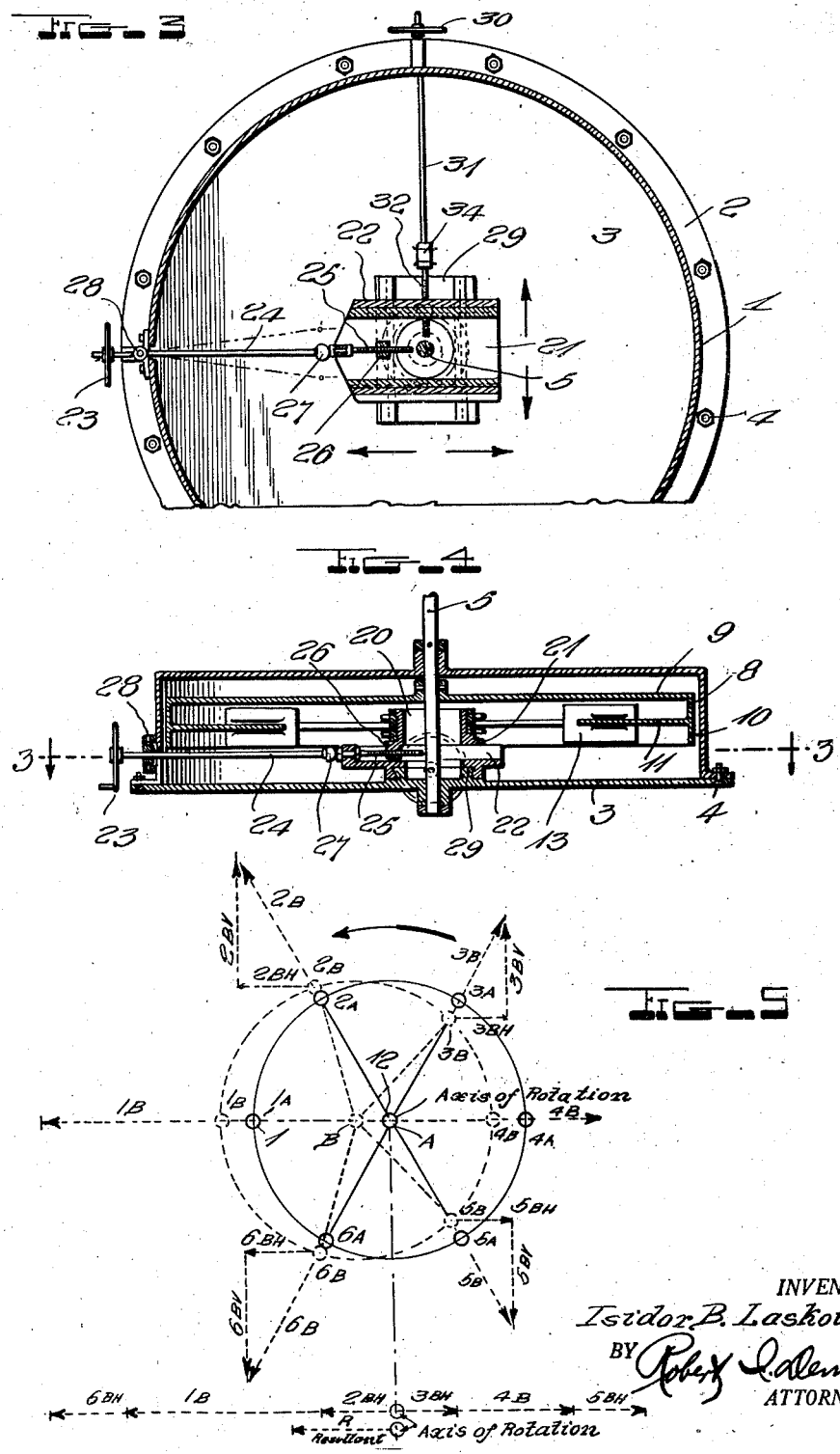

Patented Apr. 10, 1934

1,953,964

UNITED STATES PATENT OFFICE 1,953,964

CENTRIFUGAL VARIABLE THRUST MECHANISM

Isidor B. Laskowitz, Brooklyn, N. Y.

Application June 11, 1931, Serial No. 543,678

20 Claims. (Cl. 74—14)

The present invention relates to improvements in mechanical movement and has reference more particularly to a centrifugal variable thrust mechanism.

The primary object of the invention is to provide a centrifugal variable thrust mechanism wherein the principle of centrifugal force is utilized and which is capable of developing a thrust that may be varied.

Another important object is to provide a centrifugal variable thrust mechanism for use upon aircraft, land vehicles, water craft and any other craft requiring the use of a thrust for effecting the propulsion of the vehicle.

At the present time, vehicles or craft of various kinds have their propulsion means so constructed and arranged that there is a positive connection between the propelling device on the vehicle or craft and the medium upon or through which the vehicle or craft travels. In the centrifugal variable thrust mechanism, however, the propelling or driving force is entirely independent of the medium upon or through which the vehicle or craft travels, but depends upon the control of the centrifugal forces set up so as to produce the resultant thrust or propelling force in the desired direction.

Another salient object of the present invention resides in the provision of a centrifugal variable thrust mechanism wherein the resultant thrust is capable of being varied from zero to a maximum in any direction, in a plane surface, with the motor, engine or other prime mover operating at a constant rate of speed in one direction.

Another important object is to provide a centrifugal variable thrust mechanism of the above mentioned character that includes a series of inter-connected weights having means associated therewith whereby the axis of an eccentric member operatively connected to the weights may be shifted to cause the weights to assume different positions and causing the radial distances between the weights and the axis of rotation to vary so that the rotation of the weights will result in different centrifugal forces being set up, thus causing an unbalanced resultant thrust to be set up that will tend to move the mechanism and which resultant thrust may be utilized as the propelling force.

A still further object is to provide a centrifugal variable thrust mechanism of the above mentioned character wherein the parts are so arranged as to permit the same to be readily and easily operated for positioning the weights where desired, the device being further at all times positive and efficient in its operation, as well as simple in construction, strong and durable.

Other objects and advantages of the present invention will become apparent from the following description when taken in conjunction with the accompanying drawings.

In the accompanying drawings, wherein like reference characters designate corresponding parts throughout the several views:

Figure 1 is a horizontal sectional view taken approximately on the line 1—1 of Figure 2, looking downwardly;

Figure 2 is a vertical sectional view taken approximately on the line 2—2 of Figure 1;

Figure 3 is also a horizontal sectional view taken approximately on the line 3—3 of Figure 4, looking downwardly;

Figure 4 is a view similar to Figure 2 taken on the line 4—4 of Figure 1; and

Figure 5 is a diagrammatic view showing the elements of the mechanism in their normal and displaced positions for thrust in a particular direction, and further showing the forces acting thereon.

In the drawings, wherein for the purpose of illustration is shown the preferred embodiment of my invention, the numeral 1 designates a circular casing or housing that is open at its bottom, an outwardly extending flange 2 being formed around the lower edge of the circular casing. A removable bottom plate 3 is provided for the open bottom side of this casing and suitable fastening means shown at 4 extends through the flange 2 and the perimeter of the bottom plate to secure the latter in position.

Extending centrally through the casing 1 and the bottom plate 3 is the power shaft 5 which may be driven by motor, engine or other prime mover (not shown). Suitable bearings for the power shaft 5 are associated with the top of the casing 1 and the bottom plate 3 as indicated at 6 and for the purpose of preventing axial movement of the power shaft with respect to the casing and bottom plate, there is arranged on the power shaft, suitable collars 7.

Keyed to the shaft 5 for rotation therewith and arranged within the circular casing 1 is what may be termed a cage denoted generally by the numeral 8. The cage includes a plate or disk 9 having a down turned annular flange 10 at its edge and extending inwardly from the flange 10 in spaced relation with respect to the top plate 9 are the segmental ribs 11, the same being shown more clearly in Figure 1 of the drawings. These ribs are spaced with respect to each other to provide guideways 12 for the reception of slidable weights 13, the specific construction of which will be hereinafter and more fully described.

Upon referring to Figure 1, it will also be observed that the inner edges of the segmental ribs 11 are curved and are spaced a considerable distance away from the power shaft 5.

The weights 13 are each formed with longitudinal grooves in the opposed sides thereof to accommodate the opposed edges of the respective guideways 12, said grooves being designated by the numeral 14. The inner end portion of each weight is formed with a socket for the reception of the outer end of a connecting rod. In the present instance, there is disclosed six weights and obviously, there are six connecting rods. One of the connecting rods is a master connecting rod and is designated by the numeral 15, the other connecting rods being designated by the numeral 16. The outer ends of all of the connecting rods are pivotally connected to their respective weights by means of pins 17 that extend transversely through the weights and through the inner ends of the sockets as well as through eyes formed at the outer ends of the connecting rods in the manner as also clearly illustrated in Figures 1 and 2.

A ring 18 encircles the shaft 5 and the inner end of the master connecting rod 15 is formed integrally with this ring while the inner ends of the other connecting rods 16 are pivotally connected to the ring 18 as at 19.

This ring 18 is coaxially mounted on a sleeve 20 that also surrounds the power shaft 5, said sleeve being carried by an eccentric bracket 21 that is slidably mounted on the bracket 22. The eccentric bracket 21 is capable of being moved from side to side by rotating the hand wheel 23 secured on the outer end of the shaft 24, the inner end of the shaft being threaded as indicated at 25 for cooperation with the internally threaded boss 26 carried by the eccentric bracket 21.

Suitable collars and bearings are provided to take up the thrust on the shaft or spindle 24 and a universal joint 27 is associated with the shaft or spindle 24 to allow for the angularity of movement of the shaft when the bracket member 22 and the eccentric bracket 21 are moved transversely as will be presently described. A swivel bearing 28 is also provided for the outer end portion of the shaft or spindle 24 adjacent the hand wheel 23 as clearly disclosed in Figures 3 and 4 of the drawings.

The bracket 22 is mounted for slidable movement on the ribbed member 29 forming a part of the bottom plate 3 and this bracket 22 may be laterally adjusted by operating the hand wheel 30 which rotates the shaft or spindle 31, the inner end of this shaft or spindle being threaded as indicated at 32 for cooperation with the internally threaded boss 33 carried by the bracket 22 as suggested very clearly in Figures 2 and 3 of the drawings. Suitable collars and bearings are also provided to take up the thrust on the shaft or spindle 31 as suggested at 34 in Figure 2.

This arrangement of the adjustable brackets will permit the movement of the axis of the eccentric bracket 21 and the sleeve 20 associated therewith to any other eccentric position in a plane surface away from the axis of the power shaft 5 such as for example from "A" to "B". The new position is shown in dotted lines in Figure 1 and also more clearly in the diagrammatic illustration in Figure 5.

The full line position of the parts show the axis of the sleeve 20 coinciding with the axis of the power shaft 5 as at "A". In this position, when the weights are rotated, they are all spaced at equal distances from the axis of rotation "A" and consequently, the centrifugal force set up in each weight 13 is the same.

The forces are all in equilibrium and no unbalanced resultant thrust is set up. However, by shifting the axis of the eccentric bracket 21 and the sleeve 20 associated therewith from position "A" to position "B", it will be observed that the weights 13 have assumed new positions as indicated by the dotted lines and when in this last mentioned position, the radial distances of the weights from the axis of rotation "A" vary. The result is that when the weights 13 are rotated, different centrifugal forces are set up in the weights and an unbalanced resultant thrust "R" in the direction shown by the arrow in Figure 5 is set up, tending to move the mechanism and which resultant thrust may be utilized as a propelling force.

The axis "B" may be moved to any other position in relation to axis "A" in a plane surface and thus the direction of resultant thrust "R" may be controlled. Furthermore, with the power shaft 5 rotating at a constant rate of speed, it is possible to increase or decrease the intensity of the resultant force "R" by increasing or decreasing the distance of axis "B" from "A". This will be clearly understood from a study of Figure 5 and bearing in mind that the centrifugal force acting on a weight or mass is proportional to its distance from the axis of rotation. In one complete revolution of the cage 8, with the axis of the eccentric bracket 21 located at "B", each weight will assume the various positions shown in the dotted lines in Figure 5. If the position of axis "B" is fixed in relation to axis "A", then the direction of resultant "R" is determined and if the speed of the power shaft 5 is varied from zero to a maximum, it is possible to vary the intensity of the resultant "R" and consequently, the propelling force may be varied from zero to a maximum.

While the weights 13 are rotating in the direction indicated by the arrows there is set up a reaction torque in the opposite direction, which would have a tendency to move the circular casing or housing, 1 in the opposite direction to the movement of the weights, 13. Where the mounting of the mechanism is not capable of absorbing or resisting this reaction torque it is the intention to install two units or multiples of two units, each pair of units rotating in opposite directions, so that the reaction torques may be balanced. This may be done either by placing the units one over the other or side by side or by any other suitable combination in order to balance the reaction torque.

It will thus be seen from the foregoing description that I have provided a centrifugal variable thrust mechanism that may be readily and easily adjusted for accomplishing the desired results. A centrifugal variable thrust mechanism of this character may be used on aircraft, land craft, water craft and the same will at all times be positive and efficient in carrying out the purposes for which it is designed.

While I have shown the preferred embodiment of the invention, it is to be understood that minor changes in the size, shape and arrangement of parts may be resorted to without departing from the spirit of the invention and the scope of the appended claims.

Having thus described the invention, what is claimed is:

1. In a variable thrust mechanism, a fixed axis of rotation, a weight rotatable about said axis, and means for causing the weight to assume different positions with respect to the axis of rotation to set up different centrifugal forces and causing an unbalanced resultant thrust to be produced, the intensity of which may be controlled, and for controlling the direction of the resultant thrust.

2. In a variable thrust mechanism, a fixed axis of rotation, a weight rotatable about the fixed axis, means for rotating the weight, and additional means for causing the weight to assume different positions with respect to the axis of rotation to set up different centrifugal forces and causing thereby an unbalanced resultant thrust to be produced, the direction and intensity of which may be controlled.

3. In a variable thrust mechanism, a rotatable shaft, the axis thereof being fixed, a weight rotatable about the shaft, means for rotating the weight, additional means for shifting the weight with respect to the axis of the rotatable shaft, causing the weight to assume different positions to set up different centrifugal forces and causing an unbalanced resultant thrust to be produced the direction of which may be controlled.

4. In a variable thrust mechanism, a rotatable shaft, the axis thereof being fixed, a weight rotatable about the shaft and capable of movement in a plane surface, means for rotating the weight, and additional means for shifting the weight to prelocate the axis of the weight with respect to the axis of the rotatable shaft, causing the weight to assume definite positions with respect to the axis of rotation to set up different centrifugal forces and thereby causing an unbalanced resultant thrust to be produced, the direction of which may be controlled.

5. In a variable thrust mechanism, a rotatable shaft having a fixed axis, a series of interconnected rotatable weights surrounding the shaft and means for causing the weights to assume different positions and distances with respect to the axis of rotation of the shaft to set up different centrifugal forces, in said weights, causing thereby an unbalanced resultant thrust to be produced, the direction of which may be controlled.

6. In a variable thrust mechanism, a rotatable shaft, a unit surrounding said shaft and connected thereto for rotation therewith, a series of weights slidably associated with said units, a ring encircling the shaft and operatively connected to the weights, and means for moving the ring in a plane surface to shift the position of the weights with respect to said shaft causing different centrifugal forces to be set up.

7. In a variable thrust mechanism, a rotatable shaft, a sleeve surrounding the shaft, connecting rods connected at their inner ends to the sleeve at spaced intervals, weights carried by the outer ends of said rods, and means for moving the sleeve with the rods and weights connected thereto radially with respect to the shaft to cause the weights to assume different positions and distances from the axis of rotation, thereby setting up different centrifugal forces.

8. In a variable thrust mechanism, a rotatable shaft, a sleeve surrounding the shaft, connecting rods connected at their inner ends to the sleeve at spaced intervals, weights carried by the outer ends of said rods, and means for moving the sleeve with the rods and weights connected thereto radially with respect to the shaft to cause the weights to assume different positions and distances from the axis of rotation, thereby setting up different centrifugal forces, said sleeve being capable of movement in more than one direction.

9. In a variable thrust mechanism, a rotatable shaft, a sleeve surrounding the shaft, connecting rods connected at their inner ends to the sleeve at spaced intervals, weights carried by the outer ends of said rod, and means for moving the sleeve with the rods and weights connected thereto radially with respect to the shaft to cause the weights to assume different positions and distances from the axis of rotation, thereby setting up different centrifugal forces, and supporting means for the shiftable weights.

10. In a variable thrust mechanism, a rotatable shaft having a fixed axis, a sleeve encircling the shaft and spaced therefrom, connecting rods extending radially from the sleeve, weights carried by the outer ends of the rods, a support on which said weights are slidable, and remotely controlled means for moving the sleeve radially to cause the weights to assume different positions and distances from the axis of rotation, thereby setting up different centrifugal forces.

11. In a variable thrust mechanism, a rotatable shaft having a fixed axis, a sleeve encircling the shaft and spaced therefrom, connecting rods extending radially from the sleeve, weights carried by the outer ends of the rods, a support on which said weights are slidable, and remotely controlled means for moving the sleeve radially to cause the weights to assume different positions and distances from the axis of rotation, thereby setting up different centrifugal forces, said sleeve, connecting rods and weights being shiftable in a plane surface in more than one direction.

12. In a variable thrust mechanism, a rotatable shaft, a cage fixedly secured on the shaft, a sleeve encircling the shaft and spaced therefrom, connecting rods extending radially from the sleeve for disposition within the cage, weights carried by the outer ends of the connecting rods, supports for the slidable weights in the cage, and means for moving the sleeve radially with respect to the rotatable shaft to cause the weights to assume different positions and distances from the axis of rotation, thereby setting up different centrifugal forces and an unbalanced resultant thrust.

13. In a variable thrust mechanism, a rotatable shaft, a cage fixedly secured on the shaft, a sleeve encircling the shaft and spaced therefrom, connecting rods extending radially from the sleeve for disposition within the cage, weights carried by the outer ends of the connecting rods, supports for the slidable weights in the cage and remotely controlled means for moving the sleeve radially in more than one direction with respect to the rotatable shaft to cause the weights to assume different positions and distances from the axis of rotation of the shaft, thereby setting up different centrifugal forces and an unbalanced resultant thrust.

14. In a variable thrust mechanism, a rotatable shaft, a cage fixedly secured on the shaft, a sleeve encircling the shaft and spaced therefrom, connecting rods extending radially from the sleeve for disposition within the cage, weights carried by the outer ends of the connecting rods, supports for the slidable weights in the cage and remotely controlled means for moving the sleeve radially in more than one direction with respect to the rotatable shaft to cause the weights to assume different positions and distances from the axis of rotation of the shaft, thereby setting up different centrifugal forces and an unbalanced resultant thrust, said last mentioned means including a pair of superposed brackets interconnected and slidable in opposite directions, said sleeve being connected to one of said brackets for movement therewith.

15. In a variable thrust mechanism, a rotatable shaft having a fixed axis, a sleeve surrounding the shaft and spaced therefrom, a ring encircling the sleeve and rotatable thereon, connecting rods extending radially from the rotatable ring, weights carried by the outer ends of the connecting rods, supporting means for the weights carried by the shaft, the weights being slidable on said supporting means and additional means for moving the sleeve radially in a plane surface for causing the weights to assume different positions and distances from the axis of rotation, thereby setting up different centrifugal forces and an unbalanced resultant thrust.

16. In a variable thrust mechanism, a rotatable shaft having a fixed axis, a sleeve surrounding the shaft and spaced therefrom, a ring encircling the sleeve and rotatable thereon, connecting rods extending radially from the rotatable ring, weights, carried by the outer ends of the connecting rods, supporting means for the weights carried by the shaft, the weights being slidable on said supporting means and additional means for moving the sleeve radially in a plane surface for causing the weights to assume different positions and distances from the axis of rotation, thereby setting up different centrifugal forces and an unbalanced resultant thrust, said sleeve and the elements carried thereby being capable of movement in more than one direction.

17. In a variable thrust mechanism, a rotatable shaft having a fixed axis, a sleeve surrounding the shaft and spaced therefrom, a ring encircling the sleeve and rotatable thereon, connecting rods extending radially from the rotatable ring, weights carried by the outer ends of the connecting rods, supporting means for the weights carried by the shaft, the weights being slidable on said supporting means and additional means for moving the sleeve radially in a plane surface for causing the weights to assume different positions and distances from the axis of rotation, thereby setting up different centrifugal forces and an unbalanced resultant thrust, said last mentioned means including a pair of interconnected brackets slidable in opposite directions, said sleeve being carried by one of said brackets.

18. In a variable thrust mechanism, a rotatable shaft having a fixed axis, a sleeve surrounding the shaft and spaced therefrom, a ring encircling the sleeve and rotatable thereon, connecting rods extending radially from the rotatable ring, weights carried by the outer ends of the connecting rods, supporting means for the weights carried by the shaft, the weights being slidable on said supporting means and additional means for moving the sleeve radially in a plane surface for causing the weights to assume different positions and distances from the axis of rotation, thereby setting up different centrifugal forces and an unbalanced resultant thrust, said last mentioned means including a pair of interconnected brackets slidable in opposite directions, said sleeve being carried by one of said brackets, and remotely controlled independent means for shifting the respective brackets.

19. In a variable thrust mechanism, a rotatable shaft, a sleeve encircling the shaft and being spaced therefrom, a ring encircling the sleeve and rotatable thereon, connecting rods pivotally connected at their inner ends to said rotatable ring, an additional connecting rod fixedly connected at its inner end to said ring, weights operatively connected to the outer ends of all of the connecting rods, a support carried by the shaft on which the weights are slidable, and means for moving the sleeve radially with respect to the shaft to adjust the positions and distances of the weights with respect to the axis of rotaion, thereby setting up different centrifugal forces and an unbalanced variable thrust.

20. In a variable thrust mechanism, a rotatable shaft, a sleeve encircling the shaft and being spaced therefrom, a ring encircling the sleeve and rotatable thereon, connecting rods pivotally connected at their inner ends to said rotatable ring, an additional connecting rod fixedly connected at its inner end to said ring, weights operatively connected to the outer ends of all of the connecting rods, a support carried by the shaft on which the weights are slidable, and means for moving the sleeve radially with respect to the shaft to adjust the positions and distances of the weights with respect to the axis of rotation, thereby setting up different centrifugal forces and an unbalanced variable thrust, said sleeve being capable of adjustment in a plane surface in more than one direction.

ISIDOR B. LASKOWITZ.